July 6, 1948.   H. A. MARSH   2,444,520
FRAME MOUNTING MEANS FOR FLEXIBLE
SHEET LIKE MATERIALS
Filed April 26, 1946   2 Sheets-Sheet 1
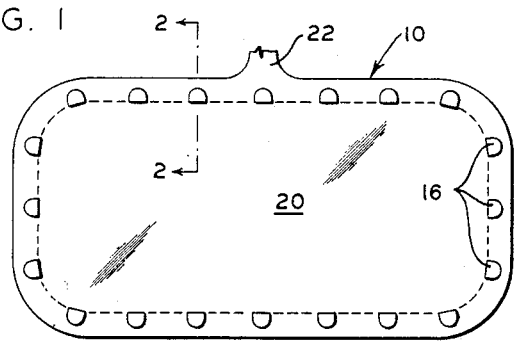
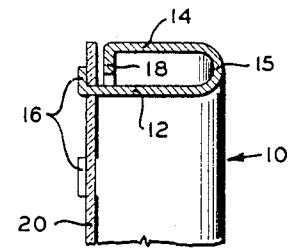
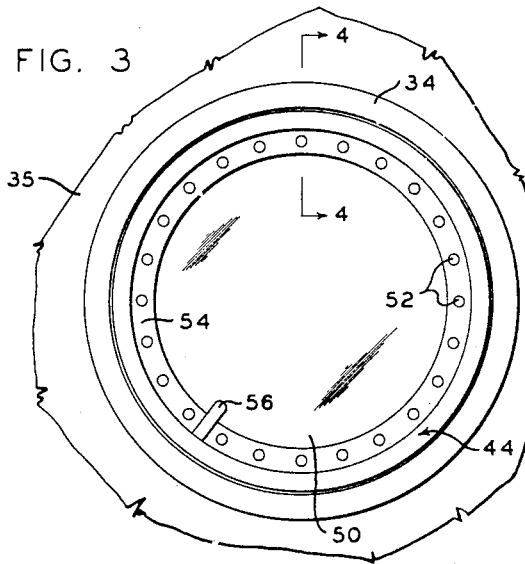
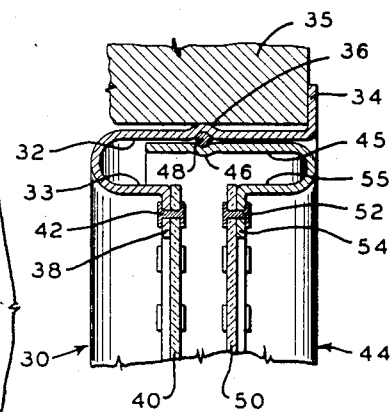
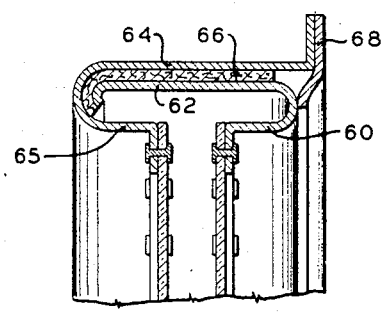
INVENTOR
Harold A. Marsh
BY
Donald C. Brown
Attorney July 6, 1948. H. A. MARSH 2,444,520
FRAME MOUNTING MEANS FOR FLEXIBLE
SHEET LIKE MATERIALS
Filed April 26, 1946 2 Sheets-Sheet 2

INVENTOR
Harold A. Marsh
BY
Donald L. Brown
Attorney

Patented July 6, 1948

2,444,520

UNITED STATES PATENT OFFICE 2,444,520

FRAME MOUNTING MEANS FOR FLEXIBLE SHEETLIKE MATERIALS

Harold A. Marsh, Brookline, Mass., assignor to Polaroid Corporation, Cambridge, Mass., a corporation of Delaware Application April 26, 1946, Serial No. 665,275

7 Claims. (Cl. 88—65)

This invention relates, in general, to new and improved mounting means for sheet plastic material, and more particularly to mounting rims or frames for viewing screens or visors and the like, embodying selectively light-transmitting sheet plastic material or any various other sheet materials.

It is a primary object of the present invention to provide rim or frame means for mounting sheets of material that are subject to variations in area due to variations in ambient temperature and moisture conditions and for holding said sheets substantially flat over a relatively wide range of temperature, and widely varying moisture conditions, and all without producing cracks or breaks, or harmful strains therein.

Another object is to provide a variable density window comprising a plurality of rims having the above characteristics and engaging one within the other and each having mounted therein a sheet of light-polarizing material.

A further object of the invention is to provide a rim comprising two rim members, spaced from each other and symmetrically positioned, and if annular, coaxially positioned, with a springy deformable means interconnecting the two members. One of the members is a support member for the sheet material, and has means defining a plane, to which the sheet is to be attached, while the other member is a stiffening member and functions to prevent the rim from buckling in the plane of the supported sheet, and from warping or twisting out of such plane due to the sheet contracting, for example, and thus decreasing the length of the perimeter of the means on which the sheet is supported. If the support member is slotted transversely of the plane of the mounted sheet, the decrease of the said perimeter is permitted by the narrowing of the slots, while if the support member is continuous, the decrease of the said perimeter results in a compression of the material in such member, and particularly of the material lying in the plane of the sheeet.

A further object of the invention is to so provide the material of the rim, its configuration, and distribution, that the stiffening member shall prevent any warping or buckling, while the slots are narrowed, or the material is being compressed, as the case may be, so as to hold the sheet smooth and plane, and still so as to prevent any breaks, or cracks, or photoelastic strains being produced in the sheet.

Other objects and advantages will in part appear, and in part be pointed out, during the course of the following detailed description of several embodiments of the invention, which are given as nonlimiting examples, taken in connection with the accompanying drawings, in which:

Figure 1 is a front view of a viewing visor embodying one form of the invention;

Fig. 2 is a partial section taken substantially on line 2—2 of Fig. 1, and viewed in the direction of the arrows;

Fig. 3 is a front view of a variable density window embodying a modification of the invention;

Fig. 4 is a partial section taken substantially on line 4—4 of Fig. 3, and viewed in the direction of the arrows;

Fig. 5 is a view, similar to Fig. 4, showing another modification of the invention;

Figure 6:
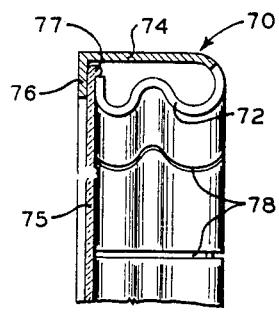
Figure 7:
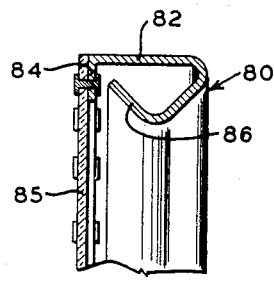
Figure 8:
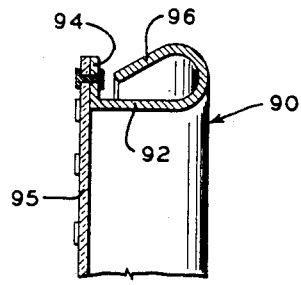
Figure 9:
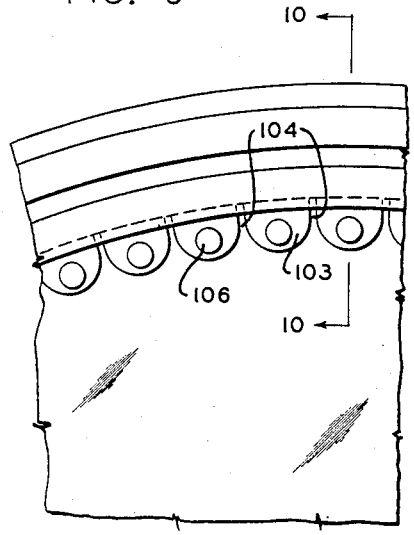
Figure 10:
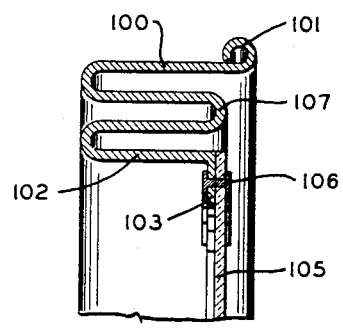

Figs. 6, 7, and 8 are views, similar to Fig. 2, showing three further modifications of the invention;

Fig. 9 is a fragmentary front view of another modification of the invention; and Fig. 10 is a sectional view, on line 10—10 of Fig. 9, and viewed in the direction of the arrows.

In the embodiment of the invention shown in Figs. 1 and 2, rim 10 comprises a strip of any suitable relatively resilient metal such, for example, as spring steel or spun aluminum. As shown, particularly in Fig. 2, said strip comprises an inner support rim member 12, and an outer stiffening rim member 14, interconnected by a curved spring acting portion 15. Along its outer edge, member 12 is provided with a series of spaced tabs 16 engaging in complementary slots around and adjacent the edge of a shet 20 of any suitable organic plastic material, and the tabs are bent over substantially parallel to the face of said sheet and perpendicular to the body of member 12. Since the type of visor shown in Fig. 1 is usually used for viewing purposes, sheet 20 will preferably comprise selectively light-transmitting, transparent plastic material such, for example, as cellulose acetate containing any desired dichroic material, or said sheet may comprise light-polarizing material, as for example, such sheet materials as are sold under the trade name "Polaroid."

In this embodiment of the invention, outer stiffening member 14 is provided with a further flange 18, extending inwardly and substantially at right angles thereto, for reinforcing purposes, and also to furnish a supporting face for the edges of sheet 20. Element 22, Fig. 1, represents any suitable mounting bracket means, which may be secured in any desired way to outer flange 14, as for example, by spot welding. Thus rim 10, as shown, is preferably made of a single piece of material, of uniform gauge throughout, with the stiffening member 14 so formed, as described above, as to maintain the rim, and sheet 20, in a plane, and the sheet smooth, despite contraction of the sheet, and a resulting decrease in the length of the perimeter of the free end of support member 12, and compression of the metal of member 12, particularly adjacent the free end thereof. The parts thus call for the proper character of material, and proportioning, and configuration, relative to the characteristics of the supported sheet 20, whereby the sheet is maintained smooth and plane and unharmed in its optical properties, even though there results, on contracting, a decrease in the length of perimeter of the free portion of support member 12, by compression of the material of the member, as hereinafter described.

A prime difficulty met with heretofore in the use of organic plastic sheet materials for viewing visors arose from the fact that in general, said materials have relatively high coefficients of thermal expansion, particularly as compared with the expansion coefficients of the metals which could readily be used for mounting said materials. Also, such materials are subject to large contraction and expansion, as the moisture content decreases and increases, respectively. The result has been that a sheet mounted to be taut and flat at one temperature may expand so much at a higher temperature, or due to increase in moisture content, as to become wrinkled, and conversely it may so greatly contract at a lower temperature, or due to drying out, as to suffer serious distortion of the light-transmitting properties, or even to rupture.

The present invention provides a successful solution of this difficulty in that the structure of rim 10 provides, under just sufficient force, for such motion between the two members as to compensate for expansion and contraction of sheet 20, while not injuring the optical properties of the sheet. It has been found particularly desirable to heat the sheet to a temperature such, for example, as 120° F. and provide that the sheet be not too dry, before securing it to the rim, and to make the connections between rim and sheet while the latter is in this condition. When it then cools to room temperature, and subsequently drys out, its shrinkage is permitted by the above-described relation between members 12 and 14 which results in continuous, substantially outward tension over the entire sheet of sufficient amount to thereby maintain it taut and flat, but without danger of wrinkling or rupture or harm to its polarizing function.

It has been found possible by means of the rim of the present invention to utilize, in the viewing visor, a sheet of an organic plastic material such as cellulose acetate as thin as of the order of 0.030 inch, and to maintain said sheet substantially completely flat over so wide a temperature range as from 0° F. to 140° F., and over widely varying moisture contents, with freedom from any harm to its polarizing properties.

While the rim can be formed of various suitable materials, it has been found, as one non-limiting example, that aluminum, and preferably spun aluminum, of a thickness of about 0.032 inch, serves the purpose admirably. The modified forms of rims, to be described below, may also advantageously be made of this same material.

Figs. 3 and 4 illustrate a variable density window comprising a pair of modified forms of the rim of the present invention, each of which has a sheet of light-polarizing material mounted therein. Outer circular rim 30, in Fig. 4, is formed similarly to rim 10, but the outer stiffening member 32 is somewhat longer than inner support flange 33, and is provided at its outer edge with a flange 34 which serves to seat rim 30 against any suitable frame means 35. Outer member 32 is shown as formed with an outwardly pressed, annular bead 36 which serves to maintain the rim in spaced relation to the inside of frame 35 and also provides for increased ease of movement between members 32 and 33.

In this form of the invention, support member 33 is provided with an inwardly extending flange portion 38, to which polarizing sheet 40 is shown as secured as by means of rivets 42. Inner rim 44 is also circular and is similar in cross section to outer rim 30 but is sufficiently smaller as to snugly engage within rim 30. Its flange 45 is shown as formed with an inwardly pressed, annular bead 46 adapted to register with bead 36 in member 32 of rim 30, and to cooperate therewith to form a housing for a snap ring 48 for the purpose of maintaining the two rims in the desired engaged relation. Ring 48 also acts as a bearing to facilitate relative rotary motion between rims 30 and 44, and it may under some conditions also be found desirable to provide further bearing means between flanges 32 and 45, such for example, as felt, or any other suitable material.

The remainder of rim 44 is similar to the corresponding portions of rim 30, a polarizing sheet 50 being secured by rivets 52 to an annular flange 54 extending inwardly from support member 55. There is also provided a suitable handle element 56, secured to inner rim 44, to provide for ready rotation thereof within outer rim 30. It will be understood that said rotation of polarizing sheet 50 with respect to polarizing sheet 40 will bring the axes of said polarizers into successively parallel and crossed positions and thereby provide for varying the amount of transmission of light.

As described above, in connection with Figs. 1 and 2, as the sheets of polarizing material contract, and expand, the material constituting the support members is compressed, and expands, and the parts are so proportioned and constituted that forces are exerted sufficient to maintain the sheets smooth and plane, but insufficient to so resist as to cause any ruptures or cracks in the sheets, or any other harm to their polarizing characteristics.

The construction shown in Figs. 3 and 4 is particularly advantageous for mounting in any application where minimum weight is desired, as, for example, in an airplane. Rims 30 and 44 may be formed of a very light material, such as spun aluminum, about .032 inch thick, and the entire assembly, including the polarizers, can be produced in a size providing a viewing aperture having a diameter of fourteen inches or more, and yet with a total weight of the order of one pound or less. In the case of a 14-inch diameter window, after cooling and drying for several months, a change (decrease) of $\frac{1}{16}$ inch was produced, and yet the sheet was smooth and plane and entirely free from photoelastic strains.

Furthermore, all of the illustrated embodiments of the invention are characterized by low cost and ease of manufacture, since they may be readily formed by a simple stamping or spinning operation from sheet metal material.

It will be apparent that the described constructions are subject to very substantial variations without departing from the scope of the invention, and that they are also capable of many different applications in addition to those described. In all cases, however, the rim shall be such as to maintain the sheet smooth and plane and free from strains, regardless of wide variations in temperature and moisture conditions. For example, instead of using snap ring 48 in Fig. 4, annular bead 46 may be pressed outwardly to engage within annular bead 36 on the outer member of rim 30, and other equivalent guide means may also be used, such for example, as the modified structure described below and shown in Fig. 5.

In Fig. 5, outer member 62 of inner rim 60, and outer member 64 of outer rim 65, are both substantially flat in cross section, and member 62 is provided on its outer surface with a lining 66 of any material suitable for use as an antifriction bearing, such for example, as felt, velvet, rayon tape or the like. It will also be noted that material 66 extends around the edge of member 62 where it engages the inner part of member 64. It will of course be apparent that any equivalent packing means may be applied to the inside of member 64, in place of the disclosed construction. In this embodiment of the invention, means such as a retainer ring 68 may be provided to hold rim 60 within rim 65, and it may readily be screwed or otherwise secured to rim 65, when the assembly is in use.

The invention is subject to embodiment in many forms in addition to those already described, and many modifications may be made without departing from the scope of the invention, some additional examples thereof being shown in Figs. 6-8.

In Fig. 6, rim 70 comprises an inner support member 72, which is corrugated in cross section and forms, with the outer stiffening member 74, an outline similar to a capital letter B. This construction is particularly useful in a rim of small size in that it provides increased resiliency. Fig. 6 also shows novel means for attaching sheet 75 to rim 70. Member 74 has a further flange 76 extending inwardly therefrom, and at right angles thereto, similarly to flange 18 in Fig. 2, to thus impart rigidity to this stiffening member. Sheet 75 is provided with a peripheral bead 77, which may be formed in any suitable way as, for example, by passing a hot iron along the edge of said sheet in the case of a thermoplastic material such as cellulose acetate. Rim 70 is initially formed with sufficient clearance between flange 76 and the outer edge of member 72 to permit passage of bead 77 therebetween. Then, after sheet 75 is placed within the rim, member 72 is forced outward toward flange 76, by means of any suitable expanding tool, either thereby clamping the edge of the sheet, or preferably allowing a sliding fit between the sheet and flange 76, and thus the sheet is prevented from pulling out by bead 77. Thus, as in the above-described forms, the stiffening member 74 performs its above-described function.

Fig. 6 illustrates another fact about the rims of the present invention, namely, that it is not essential that the support member to which the plastic sheet is secured, be continuous. On the contrary, member 72 is shown as slotted, as at 78, to form what is essentially a series of individual spring members arranged in spaced relation along the inner side of rim 70. Thus, as the sheet contracts and expands, the slots 78 narrow and widen. A similar construction may be adopted if desired in the forms of the invention illustrated in the other figures, although it should be pointed out that it is desirable that the connections between the sheet and rim be relatively close together, as in the case of tabs 16 and rivets 42 and 52, in order to distribute, as widely and as evenly as possible, the tension placed on the sheet by the spring action of the rim. On the other hand, further modified forms of the invention may be produced utilizing a rigid mounting along a part or parts of the periphery of the sheet provided a spring mount is utilized for the other parts with said spring mount means so arranged as to exert tension over substantially the entire area of the sheet. One advantage of a discontinuous spring mounting in accordance with the invention is that such construction is particularly applicable to a rim provided with relatively sharp corners, whereas when a continuous mounting flange is used it is preferable that the corners be curved, as, for example, in Fig. 1.

Figs. 7 and 8 show alternate forms of further modifications of the rim of the invention.

In Fig. 7, the outer support member 82, of the rim 80, is substantially cylindrical in form, and is provided with an inwardly extending additional flange 84 to which the sheet 85 is secured. The inner stiffening member 86 is looped first away, and then toward, outer member 82, as shown, for providing further strength and stiffening. It should be noted that a construction such as that shown in Fig. 7, wherein the sheet is carried by the outer member, is particularly useful as a filter designed to engage in telescoping relation with a lens barrel or similar device wherein such a filter may be mounted.

Fig. 8 shows the converse of Fig. 7, with an inner member 92, of a rim 90 substantially cylindrical in shape and provided with an outwardly extending flange 94 to which a sheet 95 is secured, thus constituting the support member. Outer member 96 loops first away from, and then toward, inner member 92, in a manner similar to member 86 in Fig. 7, thus constituting the stiffening member of the rim.

In Figs. 9 and 10 is shown another form of the invention, wherein a double loop member is employed to interconnect the two rim members. In this form of invention, an outer stiffening member 100, has its free edge curled outwardly and over, as at 101, to lend stiffness to the member. The supporting rim member 102 has an inwardly turned flange, constituted by separate tabs 103, formed by slotting the flange, as at 104, and a plastic sheet 105 is carried by this flange, and is suitably connected thereto, as by means of rivets 106. The two rim members are interconnected by a resilient means comprising the looped member 107, this member and the two rim members forming a double loop construction, in section, of the general form of a W, as clearly shown in Fig. 10. While the rim may be variously constructed, in one preferred form it is made of a single piece of sheet material, of uniform thickness, as by means of stamping, pressing, spinning, or the like.

With the construction just described, when attached sheet 105 contracts, for example, the perimeter of the flange constituted by tabs 103, and the connected parts, must decrease in length, and this is permitted by a narrowing of slots 104, and a compression of the material in support member 102, and particularly of that material that lies in, and adjacent, the plane of sheet 105. By forming the attaching flange as a series of separate tabs, as by slotting the flange, the section of material that must be compressed when the said perimeter decreases in length is greatly reduced; and thus the construction can be correspondingly lighter in weight, and still the stiffening member can be stiff enough to prevent any warping or buckling of the frame under the force encountered, and so the forces on the sheet are enough to maintain it plane and smooth, and still not great enough as to produce any photoelastic strains therein, or cracks or breaks.

It should be understood that all of the above-disclosed details of forms of the invention are merely illustrative of the principles thereof, and that the invention is not limited to any of said specific embodiments. The invention is also applicable to a great many uses. The embodiment shown in Fig. 1 is particularly useful as an antiglare visor for use in an automobile or other vehicle. Any of the illustrated embodiments, and particularly any of the individual units of the variable-density window shown in Figs. 3–5, may be used alone to provide a circular viewing screen, for example, in combination with photographic lighting equipment, and rims may also be formed for use in accordance with the invention in many shapes other than those illustrated in the drawings. It should also be understood that the rims of the invention are not limited to use with light-transmitting, plastic sheets, but may, if desired, be used with sheets opaque to visible light, such particularly as ones transmitting ultraviolet or infrared radiations, or with a fabric, in any application wherein it is desirable to maintain such a sheet firm and substantially flat over a substantial range of conditions of temperature and/or moisture.

Since certain changes in carrying out the above process, and certain modifications in the articles which embody the invention may be made without departing from its scope, it is intended that all matter contained in the above description, or shown in the accompanying drawings, shall be interpreted as illustrative and not in a limiting sense.

What is claimed is:

1. In combination, a closed frame including a support member, a stiffening member spaced from the support member, and a deformable member interconnecting the first two members, a sheet of organic plastic subject to wide variations in area due to variations in ambient temperature and moisture conditions, and means including a rim slotted at intervals to form a plurality of separate tabs, for fastening the sheet, at its edges, to the support member, the support, stiffening, and deformable members forming, in section, a double loop structure shaped generally like a W.

2. In a variable density device, in combination, a pair of sheets of plastic light-polarizing material, a circular frame means for each of said sheets, each of said frame means comprising an inner flange portion, an outer flange portion and means providing a resilient connection between said flange portions, means securing one of said polarizing sheets to one of said flange portions of one of said frame means, means securing the other of said polarizing sheets to one of said flange portions of the other of said frame means, and means coupling together said flange portions of each of said frame means other than said flange portions carrying said polarizing sheets, for relative coaxial rotation.

3. In a variable density device, in combination, a pair of sheets of plastic light-polarizing material, a circular frame means for each of said sheets, each of said frame means comprising an inner flange portion, an outer flange portion and means providing a resilient connection between said flange portions, means securing one of said polarizing sheets to said inner flange portion of one of said frame means, means securing the other of said polarizing sheets to said inner flange portion of the other of said frame means, said outer flange portion of one of said frame means engaging within said outer flange portion of the other of said frame means for relative coaxial rotation, and means maintaining said engaging flange portions in predetermined axial relation.

4. In a device of the character described, in combination, a pair of circular frame means each comprising an annular band of relatively resilient metal, each of said bands being substantially channel shaped in cross section and comprising an inner flange portion, an outer flange portion and a resilient interconnecting portion, said outer flange portion of a first of said frame means engaging within said outer flange portion of the second of said frame means for relative coaxial rotation, said outer flange portions, on their engaging faces, being provided with complementary hollow bead portions, means engaging in said hollow bead portions for maintaining said engaging flange portions in predetermined axial relation, and means adapted to secure a sheet of light-polarizing plastic material to each of said inner flange portions at points spaced from said interconnecting portion.

5. In combination, a frame comprising a unitary structure having a substantially symmetrical cylindrical stiffening member, a substantially symmetrical cylindrical support member located inside of and concentrically spaced from said stiffening member, an annular resilient deformable member joining one edge of said stiffening member to one edge of said support member and adapted to be deflected upon the application of a predetermined stress to the second edge of said support member, and a sheet of material fastened to said second edge of said support member, said material being subject to rupture when subjected to a stress greater than said predetermined stress, the plane of said sheet material being substantially perpendicular to the axes of said cylindrical stiffening and support members.

6. In combination, a frame comprising a unitary structure having a substantially symmetrical cylindrical stiffening member, a substantially symmetrical cylindrical support member located inside of and concentrically spaced from said stiffening member, an annular resilient deformable member joining one edge of said stiffening member to one edge of said support member and adapted to be deflected upon the application of a predetermined stress to the second edge of said support member, means including a rim on said second edge of said support member slotted at intervals to form a plurality of separate tabs, and a sheet of material fastened to said second edge of said support member by means of said tabs, said material being subject to rupture when subjected to a stress greater than said predetermined stress.

7. In combination, a frame comprising a unitary structure having a substantially symmetrical cylindrical stiffening member, a substantially symmetrical cylindrical support member located inside of and concentrically spaced from said stiffening member, an annular resilient deformable member joining one edge of said stiffening member to one edge of said support member and adapted to be deflected upon the application of a predetermined stress to the second edge of said support member, and a sheet of material fastened to said second edge of said support member by means of a bead around the edge of said sheet material which engages said second edge of said support member, said material being subject to rupture when subjected to a stress greater than said predetermined stress, the plane of said sheet material being substantially perpendicular to the axes of said cylindrical stiffening and support members.

HAROLD A. MARSH.

REFERENCES CITED

The following references are of record in the file of this patent:

UNITED STATES PATENTS

| Number | Name | Date |
| --- | --- | --- |
| 532,751 | Bartlett et al. | Jan. 22, 1895 |
| 1,099,959 | Wylie | June 16, 1914 |
| 1,237,562 | Schoenberg | Aug. 21, 1917 |
| 1,404,668 | Tillyer | Jan. 24, 1922 |
| 1,405,892 | Berger | Feb. 7, 1922 |
| 1,613,933 | Castleton | Jan. 11, 1927 |
| 1,646,376 | Waddell | Oct. 18, 1927 |
| 1,874,550 | Kuhn | Aug. 30, 1932 |
| 2,058,703 | Malivert | Oct. 27, 1936 |
| 2,261,957 | Burchell | Nov. 11, 1941 |
| 2,399,658 | Banker | May 7, 1946 |